Oct. 13, 1936.  O. C. ANKENY  2,056,946
MOWER PITMAN BEARING HOUSING ASSEMBLY
Filed March 14, 1935
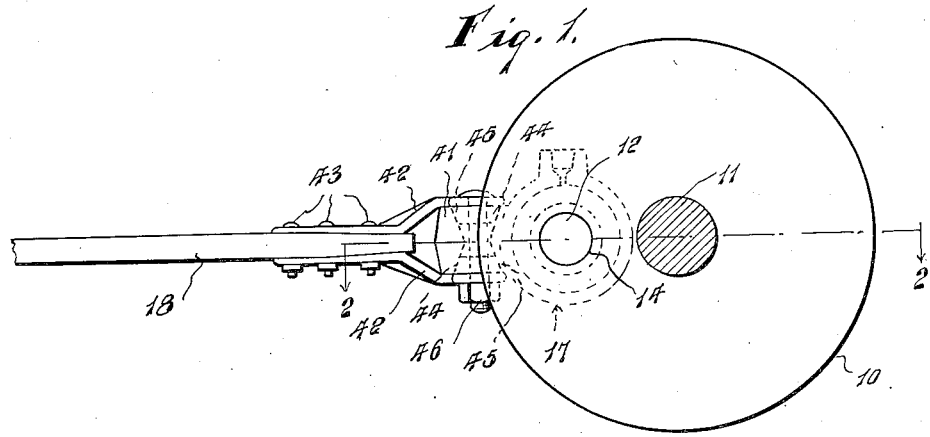
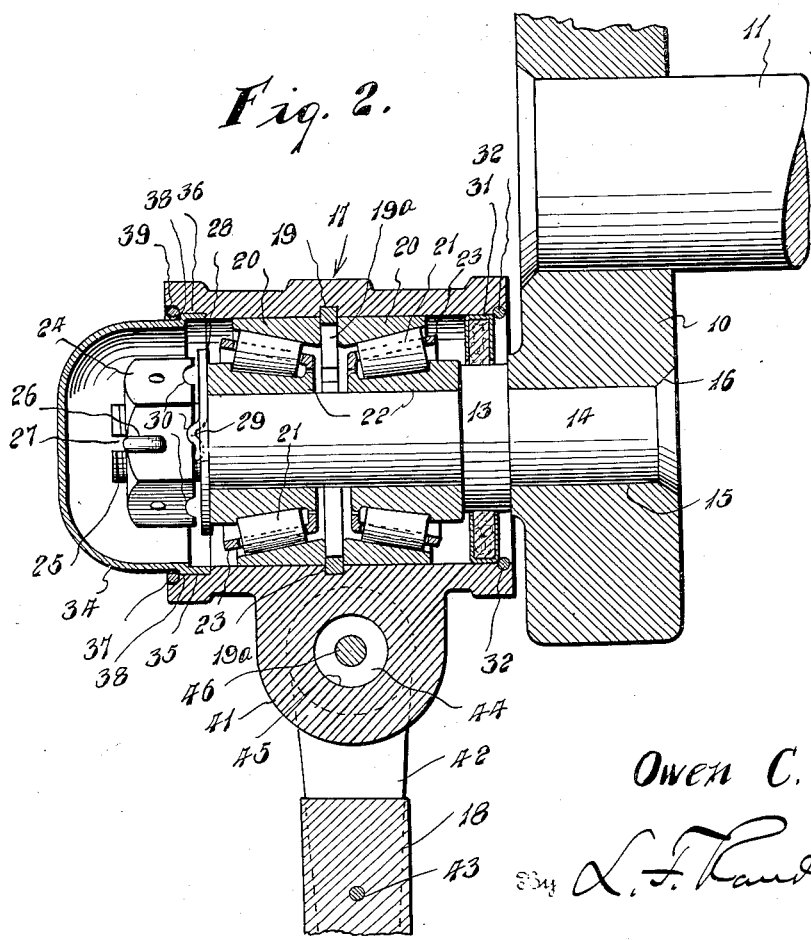
Inventor
Owen C. Ankeny.
Attorney Patented Oct. 13, 1936

2,056,946

UNITED STATES PATENT OFFICE 2,056,946

MOWER PITMAN BEARING HOUSING ASSEMBLY

Owen C. Ankeny, Gillette, Wyo.

Application March 14, 1935, Serial No. 11,110

1 Claim. (Cl. 308—179)

This invention relates to a universal pitman bearing housing assembly used primarily in the driving mechanism for mowing machine cutter bars.

The present constructions of assemblies as referred to are of short life, wearing out much ahead of the mowing machine as a whole; operate with undue friction; cannot effectively retain lubricant; and have a cap secured in place by screw-threads and quite subject to damage through impact with an obstacle.

The present invention aims to overcome the various defects mentioned and to generally improve, simplify and increase the life of an assembly of the character described.

It is also aimed to provide a novel construction wherein the roller bearings are associated with a pin and pitman, for which pitman the pin constitutes a driving crank.

It is further aimed to provide a novel construction wherein the pitman is connected in a novel and snap manner to the housing.

The more specific objects and advantages will in part be pointed out hereinafter and otherwise become apparent from a consideration of the description following taken in connection with the accompanying drawing illustrating an operative embodiment.

In said drawing:—

Figure 1 is a view in side elevation showing my improvement in relation to a cutter bar operating pitman, and the crank or fly wheel which drives said pitman, and Figure 2 is an enlarged detail sectional view taken on the line 2—2 of Figure 1.

Referring specifically to the drawing like reference characters designate like or similar parts, 10 designates a fly wheel or disk which is positively driven by a shaft 11 on which it is keyed, and which shaft is rotated through the operation of a mowing machine.

A pin 12 is carried by the driver member 10 in eccentric or crank relation thereto, such pin having a shoulder at 13, usually being an integral lateral enlargement. At one side of the shoulder, the pin has an integral rivet portion 14 which passes through an opening 15 in the driver 10 and the free end of which is upset as at 16, so that the upset portion 16 and the shoulder or enlargement 13 engage opposite faces of the driver and the pin is rigidly attached thereto.

About the major portion of the pin 12 and enlargement 13, a housing 17 is journaled, to which a pitman 18 is pivotally connected on an axis at a right angle to that of the pin 12 and which pitman 18 is adapted to drive or operate the cutter bar of the mowing machine.

Said housing 17 midway of its ends and on its interior surface has an angular groove 19 into which a split ring 19ª, preferably square in cross section is snapped or expanded, the same constituting an abutment or outer ring sections 20 which are pressed into place interiorly of the housing. Tapered roller bearings 21 engage the inner tapered surfaces of the rings 20 and also engage the tapered surfaces of cones 22 which are pressed into place on the pin 12, the bearings 21 being positioned and retained through the aid of cages 23. Such bearing structure as a whole, it will be realized is of the take-up type.

To hold the bearings and housing in place on the pin 12, a nut 24 is screw-threaded to a reduced outer end 25 thereof, the nut preferably being of the castellated type, having a cotter at 26 engaging a slot 27 of the nut. In addition, at the base of the nut, a lock washer 28 is provided which has a struck out finger 29 adapted to snap into the adjacent notch or recess 30 in the base of the nut.

The housing 17 is adapted to retain a body staff of any suitable lubricant and to this end, at the inner side thereof, a washer 31, primarily of felt or a composition is disposed in intimate contact with the bore of the housing 17 and with the periphery of the enlargement 13, such washer being retained in place through the engagement of a split snap wire ring 32 with an annular groove 33 of the housing.

At the opposite end the housing is closed by a metallic cap 34 having an offset portion 35 which telescopes into the housing and bears against a shoulder 36 therein. A split, snap wire ring 37 bears against a shoulder 38 produced by the offset 35 and the ring 37 snaps into an annular groove 39 at the entrance to the bore of the housing 17. Particular attention is called to the fact that this construction avoids the use of screw-threads in attaching the cap to the housing. Thus in case of impact, there will be no screw-threads to be damaged, and as a matter of fact, in most instances, the impact will serve to dislodge the cap 34, springing the retaining wire 37 out of place, and thus releasing the cap and wire without damage thereto.

As to the means for attaching the pitman 18 to the housing, an integral, perforated boss 41 is provided on the side of the housing, according to whether or not the machine is a right or left hand one. Specifically, two attaching arms 42 are bolted or otherwise fastened as at 43 to the pitman and such arms have inwardly extending frusto-conical extensions 44 engaging the walls of the opening of the boss which is designated 45, and which walls correspond to the exterior of the bosses. Said arms 42 are resilient so that the extensions 44 may be snapped into and out of the opening 45. A bolt 46 removably extends through the arms, enlargements 44 and the opening 45.

It will be realized that the construction described provides an assembly that will remain well lubricated, will have a life greater than that of the machine and is of generally improved construction.

I claim as my invention:—

In an assembly of the class described, in combination with a rotatable driving disc, a pin thereon constituting a crank shaft, said pin having an enlargement intermediate its ends abutting the disc, a pitman, a housing connected to the pitman and surrounding said pin and extending substantially completely over said enlargement, bearing means between the pin and housing, a sealing means within the housing engaging the periphery of the enlargement at a distance from the inner end of the housing, said bearing means comprising a split snap ring engaging a groove in the bore wall of the housing, bearing rings clasped into the housing and engaging the opposite sides of said snap ring, cone members pressed on said pin, bearings intermediate said bearing rings and cone members, the bearings being of the tapered type, the surfaces engaged by the bearings extending in opposite directions on opposite sides of the snap ring, a split snap ring engaging a groove in the bore wall of the housing adjacent the inner end of the latter maintaining the sealing means between the same and one of the bearings.

OWEN C. ANKENY.